United States Patent [19]
Katzke et al.

[11] Patent Number: 6,001,406
[45] Date of Patent: *Dec. 14, 1999

[54] METHOD FOR STABILIZING A BEVERAGE CONTAINING HAZE CAUSING SUBSTANCES

[75] Inventors: Michael Katzke, Flomborn; Ralf Helmut Nendza, Freiburg, both of Germany; Jan Berglöf; Per Vretblad, both of Uppsala, Sweden

[73] Assignees: Intermag GmbH, Bodenheim, Germany; Pharmacia Biotech AB, Uppsala, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/852,964

[22] Filed: May 9, 1997

[30] Foreign Application Priority Data

May 10, 1996 [SE] Sweden .................................. 9601789

[51] Int. Cl.$^6$ ...................................................... C12H 1/04
[52] U.S. Cl. .......................... 426/422; 426/271; 426/330; 426/330.3; 426/330.4; 426/592; 426/490; 210/660; 210/670; 210/690; 210/691
[58] Field of Search ..................................... 426/271, 330, 426/330.4, 592, 490, 422, 330.3; 210/660, 670, 690, 691

[56] References Cited

U.S. PATENT DOCUMENTS

| | | | |
|---|---|---|---|
| 3,623,955 | 11/1971 | Keay ....................................... | 195/66 R |
| 3,878,300 | 4/1975 | Milligan .............................. | 426/330 X |
| 3,940,498 | 2/1976 | Butterworth et al. .................. | 426/423 |
| 4,100,149 | 7/1978 | Meiller et al. ....................... | 260/112 R |
| 4,156,025 | 5/1979 | Dalgleish .................................. | 426/271 |
| 4,288,462 | 9/1981 | Hou et al. ................................ | 426/423 |
| 4,320,009 | 3/1982 | Hilton et al. ........................ | 426/217 X |
| 4,331,483 | 5/1982 | Mirabel .................................. | 127/46.2 |
| 4,775,541 | 10/1988 | Brown et al. ........................... | 426/271 |

FOREIGN PATENT DOCUMENTS

0166238A1  1/1986  European Pat. Off. .

OTHER PUBLICATIONS

Hughes, Food Technology in New Zealand, vol. 10, No. 30, Jul. 1985.
Dialog Information Services, File 351, WPI Dialog Accession No. 007947452, WPI Accession No. 89–212564/29 & SU,A,1451159, 890115, 8929 (Jan. 15, 1989).
WPI Acc. No. 81–81725D/45 (+DD–A–150,078) (Abstract only).
WPI Acc. No. 81–15897D/10 (+GB 2,056,485) (Abstract only).
WPI Acc. No. 77–09751Y/06 (+GB 1,499,849) (Abstract only).
Sogawa, Rept. Res. Lab. Kirin Brewery Co., Ltd., No. 15, pp. 17–24 (1972).

*Primary Examiner*—Milton Cano
*Attorney, Agent, or Firm*—Birch, Stewart, Kolasch & Birch, LLP

[57] ABSTRACT

The present invention relates to a method for the removal of polyphenols and proteins simultaneously from a beverage by contacting the beverage with an ion exchanger that is capable of adsorbing both types of substances. The characteristic feature of the ion exchanger to be used is that it is a water-insoluble porous hydrophilic matrix to which ion exchanging groups are covalently bound.

23 Claims, No Drawings

METHOD FOR STABILIZING A BEVERAGE CONTAINING HAZE CAUSING SUBSTANCES

TECHNICAL FIELD

The present invention relates to beverage stabilization, more precisely to a method for stabilization of beverages by removing haze-forming substances using an ion exchanger.

BACKGROUND OF THE INVENTION

The quality of beverages is measured by different parameters, such as flavour stability, biological purity and physico-chemical stability, wherein the latter is one of the most important for beer. The physico-chemical or colloidal stability describes the occurrence of non-biological haze in bottled beverages, such as beer. This haze is mainly caused by polyphenols and proteins, which are able to react to larger molecules via hydrogen bridges. The haze-forming proteins are believed to have Mw within the range of 30–60 kDa, although the range may differ depending on the source. When removing proteins with Mw above 120 kDa, the head retention of the beer decreases. Members of the polyphenol group are, inter alia, tannins and anthocyanogens which measured separately can be used as indicators for beer stabilization. To increase the beer's stability it is usual to partially remove the polyphenols, the proteins or both by using various agents and methods. The normally desired shelf life for stabilized beer is about 6 months, with variations for different countries and/or kinds of beer.

Stabilization and clarification of beverages are two terms that sometimes are used interchangeably and sometimes are used distinct concepts. In a strict sense clarification refers to the removal of haze and particulate matter that are at hand in a given beverage while stabilization refers to the removal of potentially haze-forming substances in order to render haze formation more difficult. In the context of the present invention the two terms shall be interpreted in a strict sense.

The amount of haze-forming substances and their tendency to form haze depends on several factors. See the experimental part. Each beer, for instance, is unique in composition depending on the brewery's selection of process variables, quality of hop and barley etc. This means that an acceptable level of stability/stabilization as measured by commonly accepted tests may vary between type of beer and/or brewery. In connection with the invention fixed limits for stabilization are therefore difficult to set. As a general guideline it can be said that stabilization has occurred when a value for a test measuring both haze-forming proteins and polyphenols has been changed at least 10% towards stabilization as a consequence of employing the invention. This means that a similar change or even lower change may apply to tests measuring proteins and polyphenols separately. The goal with stabilization is not to remove all haze forming proteins and/or polyphenols, because this might easily also affect the character of a specific beverage.

Background Publications

The problems with haze-causing substances in beverages have been known for several years and a number of solutions for removal thereof have been suggested.

The most common way to remove polyphenols from beverages is to use polyvinyl pyrrolidone, PVPP. Before addition to the beverage, PVPP has to be mixed with water to form a slurry. PVPP is added to the storage tank or dosed into the beer stream before the beer filter and filtered out with other haze particles. PVPP is available in two qualities: single use and re-usable differing in particle size.

From SU 1 451 159 a process is known for beer stabilization using an ion exchange sorbent for removing polyphenols. In this process, the beer is warmed to 65–75° C., and a strongly basic macro crosslinked sorbent (anion exchanger) based on copolymers of styrene and 4% divinyl compound containing functional quaternary trimethylamine groups is added. This hydrophobic sorbent is added to beer in amounts ensuring the removal of 25–30% of the polyphenols, stirred, left to stand 2–3 min., and the beer is decanted. The sorbent has a polyphenol sorption capacity of 18–19 mg/g, can be reused for at least ten times, and is regenerated with 5 parts per volume water at 45–50° C.

From Rep. Res. Lab. Kirin Brew. Co. (1972), No. 15, 17–24 an anion exchanger (Dowex 1×4 resin) is used for fractionation of polyphenols in beer. First the polyphenols are extracted from beer, such as by ethyl acetate, then this extract is subjected to anion exchange chromatography for the purpose of fractionating the polyphenols into several groups for further studies. Thus, the anion exchanger is not used for the stabilization of beverages.

In Europe, one of the most common ways to remove proteins from beer is by using silica which has in be prepared to a slurry with water. The silica gel is added to the storage tank or is constantly dosed into the beer stream before the beer filter. The silica gel is filtered out with other haze particles and is discarded after use.

Another widely used method to remove proteins is by using tannic acid. After preparing a solution of tannin and water, the tannin is added to the storage tank or is constantly dosed into the beer stream before the beer filter. The tannin is filtered out with other haze particles and is wasted after use.

Also, there exists alternative methods for removing proteins from beverages containing haze-forming substances, such as by using proteolytic enzymes or bentonite.

The fact that the widely used silica gel and tannins are not re-usable, makes them substantial contributors to environmental pollution.

During the priority year the Swedish Patent Office has issued an International Search Report citing the following publications:

a. U.S. Pat. No. 4,100,149 that deals with the removal of proteins from beer and other beverages in order to accomplish, for instance, a clarified beer. The adsorbent used is built up of polymer coated inorganic particles. The polymer carries ion exchange groups. The experimental part focuses on coated silica particles, and it is not clear if the effect achieved is due to the silica, polymer coat or charged groups.

b. EP-A-166,238 deals with neutralizing the bacteriostatic activity of polyphenols in fruit juices by addition of an agent that may or may not have ion exchange groups.

c. Hughes, Food Technology in New Zealand, 10(30) (1985) suggests that cellulosic ion exchangers could be used to stabilize beer because they are known to adsorb proteins.

d. U.S. Pat. No. 4,288,462 suggests that a filter element charged with anionic colloidal silica can be used for removing haze and haze-forming proteinaceous substances in beverages, such as beer.

e. U.S. Pat. No. 3,623,955 concerns removal a certain enzyme from beer.

f. U.S. Pat. No. 3,940,498 suggests to use an acid treated synthetic magnesium silicate for the simultaneous removal of undesireable proteins and polyphenols from beverages such as beer.

g. WPI acc. no. 89-212564/29 is the same as SU 1,451, 159 which has been discussed above.

Some additional publications are:

h. WPI acc. no 81-81725D (=DD-A-150,078) suggests the use of particulate hydrophobic material exhibiting groups capable of H bridge formation, ion exchange, chemisorption or chelation for the removal of turbity-forming materials from drinks, including beer.

i. WPI acc. no. 81-15897D (GB-A-2,056,485) suggests using positively charged particles for removing substances causing cloudiness in beverages (wine, beer, fruit juices etc). The charge has been introduced by treating the particles with a cationic polyamide-polyamine epichlorohydrin synthetic material. When contacted with the beverage the particles provoke precipitation that later can be removed by filtration.

j. WPI acc. no. 77-09751Y (=GB-A-1,499,849) suggests to remove haze precursors in beverages by the use of cation exchangers based on hydrophobic matrixes.

SUMMARY OF THE INVENTION

The present invention provides a method for the removal of polyphenols and proteins simultaneously from a beverage by contacting the beverage with an ion exchanger that is capable of adsorbing both types of substances. The characteristic feature of the ion exchanger to be used is that it is a water-insoluble porous hydrophilic matrix to which ion exchanging groups are covalently bound.

Physically the matrix may be in the form of a fixed bed consisting of packed porous beads/particles or a porous monolith or a membrane (continuous matrixes). The shape of the beads/particles may be spherical or irregular. In the alternative the matrix may be in the form of a fluidized bed that may be unmixed (classified, stabilised, expanded) in order to allow chromatography, or completely mixed as used in batch-wise procedures.

The matrix may be built up of a polymeric network exposing hydrophilic groups, such as hydroxy groups and/or amide groups, on the surface that is to contact the beverage during the inventive stabilization method, i.e. both on outer surfaces and on pore surfaces. Suitable polymers are mostly organic and of biological origin (biopolymers), although also fully synthetic polymers are also contemplated. Examples of useful biopolymers are polysaccharide gels made from dextran (Sephadex®, Pharmacia Biotech AB, Uppsala Sweden), agarose (Sepharose®, Pharmacia Biotech AB, Uppsala Sweden), starch, cellulose (Sephacel®, Pharmacia Biotech AB, Uppsala Sweden) etc that have been substituted with the appropriate ion exchanging groups and possibly also cross-linked. Appropriate examples of synthetic polymers are polymers of hydroxyalkyl acrylates or methacrylates, hydroxy alkyl vinyl ethers, acryl or methacryl amides that optionally are N-substituted etc. The above-mentioned biopolymers and synthetic polymers have a pronounced hydrophilic character because they carry hydroxy and/or amide groups along their polymer chain. Also purely hydrophobic polymers, such as polystyrenes including styrene-divinyl benzene copolymers, may be used. In the latter case it becomes imperative that the pore surfaces of the matrix have been hydrophilized, for instance by being coated (physical adsorption or grafted) with a substance that provides the appropriate hydrophilicity, for instance the above mentioned hydroxy-group containing polymers or a low molecular weight hydroxy group containing compound (SOURCE™, Pharmacia Biotech AB, Uppsala, Sweden).

The matrix, in particular in case it is in beaded form, may contain inorganic material, although as suggested above the main constituents should be of organic origin, i.e. >50% by weight (saturated with beer or water).

It is important that the porosity of the gel is sufficiently high to allow for penetration of the beverage destabilizing proteins and polyphenols. Accordingly the gel should be permeable to haze forming proteins and polyphenols and hence permeable to globular proteins below $10^7$, often below $5 \times 10^6$ Dalton. The ion exchange capacity is typically within the range 0.05–0.50 mmol per mL packed bed.

The ion exchanging groups may be cation exchanging or anion exchanging. Examples of cation exchanging groups are carboxy ($-COO^-$), sulphonic acid ($-SO_2O^-$), phosphonic acid groups etc. Examples of anion exchanging groups are quarternary, tertiary, secondary and primary amino groups ($-N^+(R_1,R_2,R_3)$). The free valence indicates a covalent link to the matrix and is typically through an organic spacer structure, for instance pure alkylene or hydroxy alkylene. $R_{1-3}$ is typically hydrogen or lower alkyl ($C_{1-6}$) that may be substituted with one or more hydroxy groups. Among the quarternary amino groups may, in particularly, be mentioned $-N^+(CH_3)_3$ that when linked to the matrix via the spacer $-CH_2CHOHCH_2-$ is called a Q-group. In the experimental part SP Sepharose® and CM Sepharose® are used. CM (carboxymethyl) in CM Sepharose® stands for $-OCH_2COO^-$ that is substituting an OH group directly linked to the base matrix (agarose). SP (sulfopropyl) stands for $-(CH_2)_3SO_3^-$ that is substituting an OH group of the base matrix (agarose) via a linker $-OCH_2CHOHCH_2O-$.

The steps of the inventive method comprise a. contacting the matrix with the beverage to be stabilized with one of the above-mentioned ion exchangers under conditions permitting adsorption of the destabilizing proteins and phenols, b. recovering the beverage from the ion-exchanger. Typically one also includes an optional third step c. meaning regeneration of the ion exchanger by contacting it with a solution for regeneration, for instance containing sodium hydroxide and sodium chloride and water only. As indicated above the contacting may be carried out by allowing the beverage to pass through a vessel (e.g. a column) containing the ion exchanger in any of the above-mentioned forms. Typically the regeneration solution is allowed to pass through in a direction that is opposite to the direction of the beverage. The process may be continuous or in a batch-wise form. After the beverage has been in contact with the ion exchanger there often is no imperative need of a further filtration step. Compare the experimental part. Typically for beer, the temperature, at least during the contact with the ion-exchanger, is above the freezing point for beer and below +10° C. such as below +5° C. Most breweries today work at about 0° C., which for practical reasons is preferred also in the inventive method. Also other steps conventionally used within the technical field of beverage stabilization may be included.

Best Mode

The best mode known at the priority date of the inventive method comprises the regeneration step as described above. The ion exchanger used is an anion exchanger of the Q-type (Q-Sepharose®) in form of macro beads (mean particle size of 200 μm) packed in column through which the beverage is allowed to flow. Q-Sepharose® is permeable to globular proteins of $4 \times 10^6$ Dalton and has an ion exchange capacity of 0.18–0.25 mmol per mL packed bed. The temperature is around 0° C. See also Example 4.

DETAILED DESCRIPTION OF THE INVENTION

The invention will now be described more closely below in association with some non-limiting Examples. The Examples are all related to beer but is it to be understood that the method according to the invention is equally applicable on other solutions, for example beverages other than beer, containing haze-forming substances.

EXPERIMENTAL PART

Materials and Methods

In the Experiments, the following analysis were carried out to describe the stability of beer.

TABLE A

| Analysis | Determination | Litterature/Source |
|---|---|---|
| Ammonium sulphate precipitation | Haze-causing protein | MEBAK*, 1993, P. 164–165 |
| Alcohol-chill-test (ACT) | Haze-causing polyphenols and proteins. Beer stability. | MEBAK*, 1993, p.160–162 |
| Polyphenols, total | Polyphenol content | MEBAK*, 1993, p.169–170 |
| Anthocyanogens | Anthocyanogen content | MEBAK*, 1993, p.171–172 |
| Accelerated Ageing test, 0/40° C. | Beer stability | MEBAK*, 1993, p.157–158 |

*MEBAK is an abbreviation of Mitteleuropäische Brautechnologische Analysenkommission.

1. Protein sensitive tests:

1.1. Ammonium sulphate precipitation. When adding a saturated ammonium sulphate solution to beer, a haze of precipitated proteins is formed. The more ammonium sulphate solution is needed to cause this haze, the more the beer is stabilized.

1.2. "Esbach-test". High molecular weight proteins will be precipitated with "Esbach-reagent" (picric acid-citric acid solution). The addition of the reagent will cause a haze which can be measured photometrically.

2. Polyphenols 2.1. Polyphenols total. All polyphenols, preferably those with vicinal hydroxyl groups, are measured. The polyphenols react in caustic solution with iron ions to coloured iron complexes, which can be measured photometrically.

2.2. Anthocyanogens are phenolic substances which will be turned into red-coloured anthocyanidines by the treatment of hydrochloric acid.

3. Tests for the determination of beer stability.

3.1. Alcohol-chill-test. When chilling beer, a reversible haze is formed, caused by precipitated polyphenol-protein complexes. The addition of alcohol decreases the solubility of these complexes and accelerates the precipitation.

3.2. Accelareted ageing test. Beer is stored at 0° C. and 40° C. or 60° C. until haze of 2 EBC units can be recognized. The haze is caused by the precipitation of polyphenol-protein complexes.

Beer stability is a complex feature and depends on several variables, including protein and/or polyphenol content. The Alcohol-chill-test and the Accelerated-ageing test show a linear relation to stabilization. The tests under item 1 and 2 above do not show a linear realtion.

The following ion exchangers were tested for use in the method according to the invention.

TABLE B

| Ion exchanger | Functional group | Exclusion limit (Daltons) | Mean bead size ($\mu$m) |
|---|---|---|---|
| Anion exchangers: | | | |
| Q Sepharose ® Fast Flow | quaternary ammonium | $4 \times 10^6$ | 90 |
| Q Sepharose ® Big Beads | quaternary ammonium | " | 200 |
| SOURCE ™ 30Q | quaternary ammonium | $\leq 10^7$ | 30 |
| DEAE Sephacel ® | diethyl amino ethyl | $1 \times 10^6$ | 100 |
| Cation exchangers: | | | |
| SP Sepharose ® Fast Flow | sulpho propyl | $4 \times 10^6$ | 90 |
| SP Sepharose ® Big Beads | " | $4 \times 10^6$ | 90 |
| CM Sepharose ® Fast Flow | carboxy methyl | $4 \times 10^6$ | 90 |

All the Experiments were run at a temperature of about 0° C. and without any pretreatment of the filtered beer.

Experiment 1

For Experiments 1 and 2, a chromatography column with an inner diameter of 50 mm (Pharmacia XK 50/20) was packed with 60 ml Q Sepharose® Big Beads. Then several liquids were pumped through the column according to the following C.I.P. (cleaning in place) program:

800 ml water, 10 min.
1000 ml 1 M NaOH, 60 min.
500 ml water, 10 min.
500 ml 2M NaCl, 30 min.
500 ml water, 10 min.

This program was also carried out after each run with beer for regeneration of the columns. 30 l filtered and unstabilized beer was pumped through the packed column with a flow rate of 6 l/h. This beer was collected, analyzed and the datas compared with untreated beer. The results are given in Table I below.

TABLE I

| Treatment of beer | ml $NH_4SO_2$/ 100 ml beer | ACT EBC units | Polyphenols mg/l | Anthocyanogenes mg/l | Accel Ageing test, days 40° C. |
|---|---|---|---|---|---|
| untreated | 10 | 10.8 | 205 | 49 | 1.5 |
| Q Sepharose ® | 15 | 4.4 | 164 | 35 | 18 |

*EBC is an abbreviation of European Brewery Convention. Reference for EBC unit is a mixture of hydrazine sulphate and hexamethylene tetramine (formazine). 1 absolute unit = 9 000 units Helm = 15 500 EBC units.

Experiment 2

50 l filtered and unstabilized beer was pumped through the packed column with a flow rate of 7.8 l/h. This beer was collected, analyzed and the datas compared with untreated beer. The results are given in Table II below.

TABLE II

| treatment of beer | ml $NH_4SO_2$ per 100 ml beer | ACT EBC units | Polyphenols mg/l | Anthocyanogenes mg/l | Accel. Ageing test, days 40° C. |
|---|---|---|---|---|---|
| untreated | 7 | 10.2 | 201 | 54 | 1.2 |
| Q Sepharose ® | 11 | 8 | 188 | 45 | 8 |

As appears from Table I and II, beer treated with Q Sepharose® had less polyphenols and anthocyanogens than the untreated beer. The protein-sensitive ammonium sulphate precipitation showed a reduction of protein in the treated beer. Furthermore, the results of the alcohol-chill-test and the ageing test showed that the colloidal stability of beer treated with Q Sepharose® was clearly better than the corresponding values for the untreated beer.

Experiment 3

Comparison of Different Ion Exchangers

In this Experiment, for each ion exchanger, a column with an inner diameter of 10 mm was packed with 3 ml ion exchanger, washed and equilibrated with 100 ml buffer (ethanol 4.5% v/v, adjusted to pH 4.5 by citric acid). Then 500 ml of filtered, unstabilized beer was pumped through each packed column.

Silica gel (FK700 from Degussa, Germany) was used for comparative purposes.

The thus treated beer was collected, analyzed and the datas are given below in Table III and IV, respectively.

TABLE III

| Sample | Haze (EBC) after adding 15 ml $NH_4SO_2$/100 ml (EBC units) |
|---|---|
| untreated beer | 10 |
| silica gel | 1,1 |
| Q Sepharose ® Fast Flow | 4,2 |
| Q Sepharose ® Big Beads | 4,8 |
| SP Sepharose ® Fast Flow | 6 |
| SP Sepharose ® Big Beads | 6 |
| CM Sepharose ® Fast Flow | 10 |

As appears from the Table, besides silica gel, Q Sepharose® led to the highest reduction of haze-causing proteins in beer. SP Sepharose® also had some stabilizing effect while CM Sepharose® had no effect at all compared with untreated beer.

TABLE IV

| Sample | Haze after adding 15 ml $NH_4SO_2$/100 ml | Alcohol-chill test (EBC units) |
|---|---|---|
| untreated | 10.0 | 25.0 |
| silica gel | 1.7 | 4.8 |
| SOURCE ™ 30Q | 4.2 | 18 |
| DEAE Sephacel ® | 4.7 | 5.6 |
| Q Sepharose ® Big Beads | 4.7 | 4.5 |
| Q Sepharose ® Fast Flow | 5.2 | 3.0 |

It appears that SOURCE™ 30Q had the best protein adsorbing properties but the result of the alcohol-chill test with this product was poor. Q Sepharose® Big Beads and DEAE Sephacel® had nearly comparable stabilizing properties and the good results of the alcohol-chill test indicated a good stability of the treated beer by the additional adsorption of polyphenols. Compared to DEAE Sephacel®, Q Sepharose® has a higher chemical stability, which is an important advantage for the cleaning and sanitation process in the brewing industry.

The preferred ion exchanger according to the invention is Q Sepharose® Big Beads in respect of beer stabilizing properties, permeability and chemical stability.

Experiment 4

Large Scale Beer Stabilization

This experiment was carried out in a brewery under practice conditions. In this brewery the beer is usually stabilized by using 15 g PVPP/hl and 30 g silica gel/hl.

For experiment 4 a chromatography column with an inner diameter of 30 cm (Pharmacia BPG 300) was packed with 9 liter of Q Sepharose® Big Beads. The bed height of Q Sepharose® in the packed column was 13 cm. Then several liquids were pumped through the column (C.I.P. program):
200 liter water, 10 min.
30 liter 2 M NaCl, 20 min.
40 liter water, 15 min.
30 liter 1 M Na OH, 120 min.
40 liter water, 15 min.
30 liter 1 M NaCl, 20 min.
40 liter water, 15 min.
This program was also carried out after each run with beer.

145 hl filtered an unstabilized beer was pumped through the packed column with a flow rate of 10 hl/h. This beer was collected and analyzed. The datas were compared with untreated beer and with beer stabilized as usual from the normal production (15 g PVPP/hl and 30 g silica gel/hl). The results are given in the table V below.

TABLE V

| treatment of beer | ml $NH_4SO_2$/ 100 ml beer | ACT, EBC units | Anthocyanogenes mg/l | Accelerated Ageing test, days at 40° C. |
|---|---|---|---|---|
| untreated | 11 | 15.1 | 65 | 1.4 |
| Q Sepharose ® | 13 | 11.2 | 48 | 7.8 |
| normal (15 g PVPP/hl) (30 g silica/hl) | 19 | 10.9 | 52 | 8 |

As appears from the table, beer treated with Q Sepharose® had less anthocyanogens than the untreated beer. The protein-sensitive ammonium sulphate precipitation showed a reduction of protein in the treated beer. The results of the alcohol-chill test and the ageing test showed that the colloidal stability of beer treated with Q Sepharose® was much better than the untreated beer. Compared with the normal treatment for stabilization of beer, Q Sepharose® has adsorbed slighty less protein but more anthocyanogens. The stabilizing effect, described with the alcohol-chill test and the ageing test, shows comparable results. This means that beer treated with Q Sepharose® had the same colloidal stability as the PVPP an silica stabilized beer, whereas the stabilization with Q Sepharose® offers the following advantages:

1. Q Sepharose® combines the effect of protein and polyphenol adsorbing materials. Therefore only one material and step is necessary instead of two for a combined beverage stabilization.
2. Q Sepharose® is reusable, whereas a reusable protein adsorbing material and a combined reusable protein and polyphenol adsorbing material does not exist.

3. Because Q Sepharose® is reusable for more than 170 cycles, it causes much less environmental pollution than single use materials.
4. The beverage stabilization with Q Sepharose® is easy to handle and can be automated.
5. The stabilization process is separated from beverage filtration. This allows a simple and combined beverage stabilization independent from current and future filter systems.
6. Compared with i.e. enzymes used for beverage stabilization, Q Sepharose® is non-soluble.

A comparison of the flow rate with a common used kieselguhr filter is given in table VI below.

TABLE VI

|  | specific flow rate, hl/m² filter area · h |
|---|---|
| kieselguhr filter | 1–2 |
| Q Sepharose ® packed column | 141 |

As appears from the table, columns packed with Q Sepharose® allow very high flow rates.

We claim:

1. A method for stabilizing a beverage containing haze causing substances, comprising the following steps:
   a) contacting the beverage with a water-insoluble porous hydrophilic matrix to which ion exchanging groups are covalently bound, which is capable of adsorbing both haze forming proteins and polyphenolic compounds, and removing a portion, but not all, of the haze forming proteins and/or polyphenolic compounds;
   b) recovering the beverage from the matrix;
   c) regenerating the matrix; and
   d) reusing the matrix from step c) in step a).

2. A method according to claim 1, wherein the matrix is a fixed bed comprising packed porous beads or particles, a porous monolith or a membrane.

3. A method according to claim 1 or 2, wherein the matrix comprises a polymeric network exposing on its surfaces hydrophilic groups.

4. A method according to claim 3, wherein the matrix is made of a hydrophilic polymer.

5. A method according to claim 4, wherein said polymer is an N-substituted acryl or methacrylamide.

6. A method according to claim 4, wherein said hydrophilic polymer is selected from the group consisting of a polysaccharide, a polymer of hydroxyalkylacrylate or methacrylate, a polymer of hydroxyalkyl vinyl ether and a polymer of acryl or methacrylamide that is optionally substituted.

7. A method according to claim 3, wherein said hydrophilic groups are hydroxy groups.

8. A method according to claim 1 wherein the matrix is permeable to globular proteins below $10^7$ Daltons.

9. A method according to claim 1 wherein the ion exchanging groups are anion exchanging groups.

10. A method according to claim 9, wherein the anion exchanging groups are quaternary ammonium groups.

11. A method according to claim 10, wherein said quaternary groups are Q-groups.

12. A method according to claims 9 or 10, wherein the matrix is based on agarose to which Q groups have been linked through —OCH$_2$CHOHCH$_2$O—.

13. A method according to claim 1 wherein the ion exchanging groups are cation exchanging groups.

14. A method according to claim 1 wherein the method is run at a temperature below 10° C., preferably below 5° C., and, for stabilization of beer, preferably above the freezing point for beer.

15. A method according to claim 14, wherein the method is run at a temperature below 5° C.

16. A method according to claim 14, wherein said beverage is beer and the method is run at a temperature above the freezing point for beer.

17. A method according to claim 1 wherein the method is run continously.

18. The method according to claim 1, wherein said haze-forming protein has a molecular weight within a range of 30–60 kDa.

19. The method according to claim 1, wherein in step a), an amount of said haze forming proteins and polyphenolic compounds are changed, such that a value for a test measuring both haze-forming proteins and polyphenolic compounds has been changed at least 10% towards stabilization, said test being selected among Alcohol Chill Test and Accelerated Aging Test.

20. A method for stabilizing a beverage containing haze causing substances, comprising the following steps:
   a) contacting a clarified beverage with a water-insoluble porous hydrophilic matrix to which ion exchanging groups are covalently bound, which is capable of adsorbing both haze forming proteins and polyphenolic compounds, and removing a portion, but not all, of the haze forming proteins and/or polyphenolic compounds;
   b) recovering the beverage from the matrix;
   c) regenerating the matrix; and
   d) reusing the matrix from step c) in step a).

21. The method according to claim 20, wherein in step a), an amount of said haze forming proteins and polyphenolic compounds are changed, such that a value for a test measuring both haze-forming proteins and polyphenolic compounds has been changed at least 10% towards stabilization, said test being selected among Alcohol Chill Test and Accelerated Aging Test.

22. A method for stabilizing a beverage containing haze causing substances, comprising the following steps:
   a) contacting the beverage with a water-insoluble porous hydrophilic matrix to which ion exchanging groups are covalently bound, which is capable of adsorbing both haze forming proteins and polyphenolic compounds, and removing a portion, but not all, of the haze forming proteins and/or polyphenolic compounds, wherein said haze forming proteins and polyphenolic compounds are removed in an amount effective to stabilize the beverage;
   b) recovering the beverage from the matrix;
   c) regenerating the matrix; and
   d) reusing the matrix from step c) in step a).

23. The method according to claim 22, wherein in step a), an amount of said haze forming proteins and polyphenolic compounds are changed, such that a value for a test measuring both haze-forming proteins and polyphenolic compounds has been changed at least 10% towards stabilization, said test being selected among Alcohol Chill Test and Accelerated Aging Test.

* * * * *